UNITED STATES PATENT OFFICE.

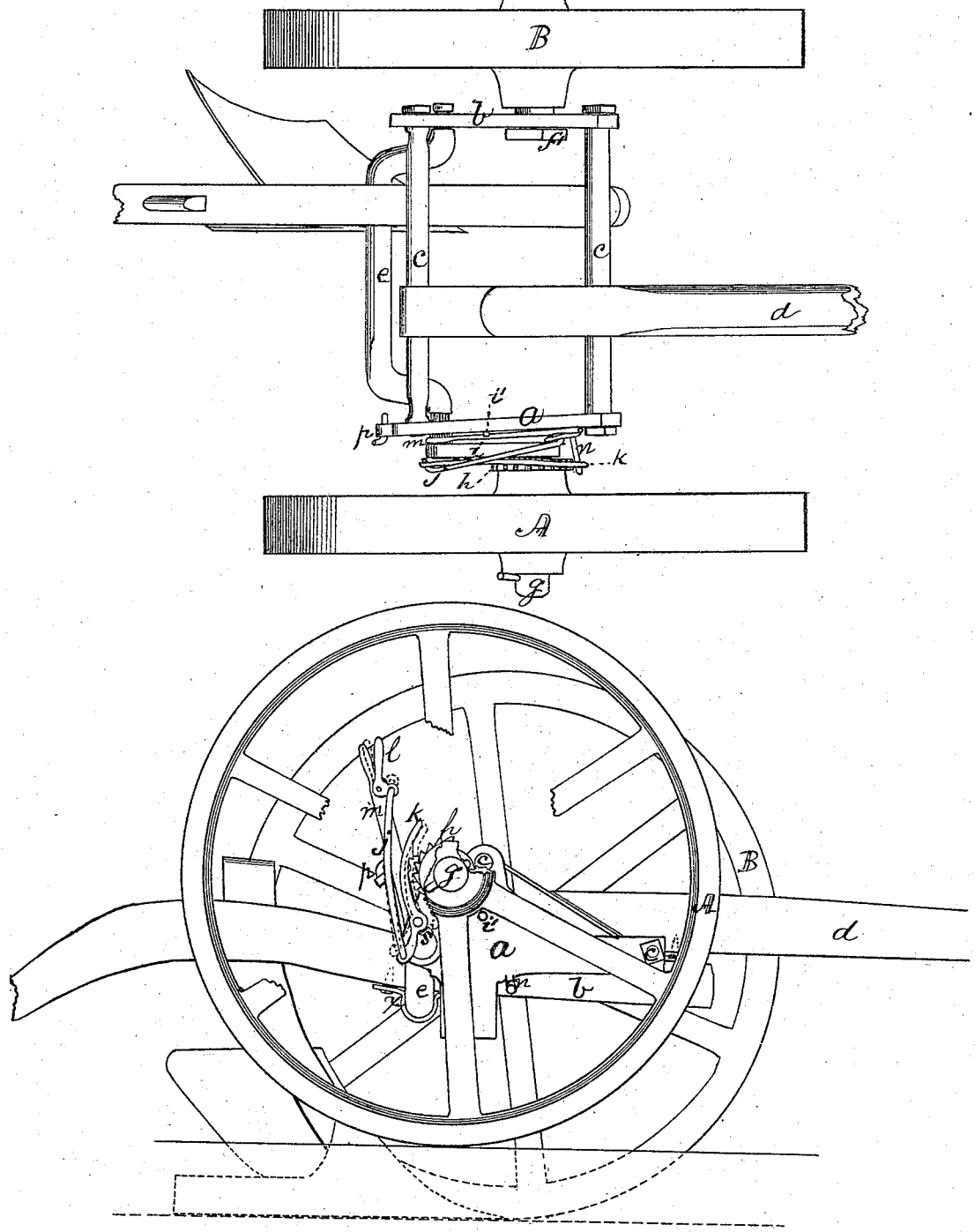

JOHN D. HARRISON, OF MIDDLETOWN, OHIO.

IMPROVEMENT IN WHEEL-PLOWS.

Specification forming part of Letters Patent No. 143,147, dated September 23, 1873; application filed August 2, 1872.

*To all whom it may concern:*

Be it known that I, JOHN D. HARRISON, of Middletown, in the county of Butler and State of Ohio, have invented a new and useful Improvement in Sulky-Plows; and I do hereby declare that the following is a full and exact description thereof, reference being had to the accompanying drawings and to the letters of reference marked thereon.

Figure 1 represents a top view or plan of my improvement, exhibiting the plow in its elevated position and the carrying-wheels upon the same horizontal plane. Fig. 2 represents a side elevation of the same with one of the wheels partly broken away to exhibit the mechanism by which the plow will be raised above the level of the ground.

In Fig. 2, the wheel at the left side is represented as occupying a furrow, and the plow-share as inserted beneath the soil.

The object of my invention is to provide a mechanism, in combination with the sulky-plow, by means of which the plow can be raised out of the ground by the power of the team, at the option of the driver, instead of requiring this difficult act to be performed by hand, as hitherto has been the practice.

The wheel-frame consists of the two side plates $a$ $b$, connected together by the round bars $c$ $c$, to which the tongue $d$ is attached by metal loops and by the double crank $e$, to which the plow-beam is fastened by its metal loop $x$. The axle-arm $f$ is secured to the plate $b$ by the nut $f'$, and is adjustable in a vertical slot made in the plate; but the axle-arm $g$ is rigidly fastened to the short arm $i$, which is also rigidly connected with the end of the double crank $e$, which is journaled in both of the frame-plates $a$ $b$. The inner end of the hub of the right side wheel is provided with a ratchet-wheel, $h$, and the outer face of the short arm $i$ has the pawl $k$ pivoted to it, so that its hook or tooth may work in connection with the ratchet. The pawl $k$ has a rearward extension, to which the rod or link $j$ is hinged, and this rod extends forward and pivots to the hand-crank arm $l$, which is pivoted to the stop-lever $m$, and the latter is rigidly fastened to the journal of the double crank $e$ between the plate $a$ and short arm $i$.

By means of arm $l$, the driver, who will ride upon the plow-frame, (a suitable seat being provided for the purpose,) may throw the pawl $k$ into action with the ratchet at his option, when the forward rotation of the wheel A will cause the elevation of the plow by revolving the double crank $e$ upon its journals in the plates $a$ $b$, and at the same time the lever $m$ will be carried around to the position represented in Fig. 1; and this lever, being made wedge-shaped transversely, it will pass beneath the detent $i'$ projecting from plate $a$; and when the ratchet-wheel $h$ on the hub of wheel A has carried the pawl around so as to elevate the plow above the surface of the ground the forward end of the pawl will strike the stud $n$, which projects horizontally from the plate $a$, and detach the pawl-tooth from the ratchet-wheel, thus allowing the wheel A to be released, when the upper edge of the lever $m$ will rest against the under side of detent $i'$, thereby retaining the plow with the double crank, to which it is attached, in an elevated position.

To cause these to drop down to the position as represented in Fig. 2, the attendant will move the lever $m$ laterally sufficiently to detach it from detent $i'$. There is a detent, $s$, projecting from the short arm $i$ under the pawl, which will limit its movement rearward.

It will be observed that in elevating the plow with the double crank $e$ the wheels A B change their relations, the wheel A moving vertically in relation to the wheel-frame, while the wheel B retains its position in relation to that frame.

The rear end of plate $a$ is provided with a segmental projection, $p$, provided with a series of holes, through which a pin can be inserted. The object of this device is to provide an adjustable stop for the lever $m$ to rest against, and serves the same function as nut $f'$ and the slot in plate $b$, by which the depth of the furrow to be plowed is determined.

The tongue $d$ is adjustable laterally upon the frame, so as to adapt the plow for use with either two or three horses.

Having fully described my improved plow, I claim and desire to secure by Letters Patent—

1. The combination of arm $l$, link $j$, lever $m$, pawl $k$, and short arm $i$ with studs $n$ $i'$, crank $e$, and ratchet-wheel $h$, substantially as and for the purpose described.

2. The combination of the frame $a$ $b$ $c$ $c$ with the journaled double crank $e$ and adjustable tongue $d$, substantially as described, for the purposes specified.

In testimony whereof I have hereunto set my hand this 17th day of July, A. D. 1872.

JOHN D. HARRISON.

Witnesses:
 E. M. FRESHMAN,
 H. P. K. PECK.